United States Patent [19]
Hinckley, Jr.

[11] Patent Number: 6,138,102
[45] Date of Patent: Oct. 24, 2000

[54] SYSTEM FOR PREVENTING CASH FLOW LOSSES

[75] Inventor: Richard A. Hinckley, Jr., Bryn Mawr, Pa.

[73] Assignee: Ace Limited, Hamilton, Bermuda

[21] Appl. No.: 09/127,257

[22] Filed: Jul. 31, 1998

[51] Int. Cl.[7] .................................................. G06F 17/60
[52] U.S. Cl. ................................. 705/4; 705/2; 705/36
[58] Field of Search ...................................... 705/2, 4, 36

[56] References Cited

U.S. PATENT DOCUMENTS

| | | | |
|---|---|---|---|
| 4,839,804 | 6/1989 | Roberts et al. ............................ | 705/36 |
| 4,876,648 | 10/1989 | Lloyd ........................................ | 705/38 |
| 5,550,734 | 8/1996 | Tarter et al. ................................ | 705/2 |
| 5,802,500 | 9/1998 | Ryan et al. ................................. | 705/36 |
| 5,852,808 | 12/1998 | Cherny ....................................... | 705/4 |
| 5,884,274 | 3/1999 | Walker et al. .............................. | 705/4 |
| 5,897,619 | 4/1999 | Hargrove, Jr. et al. .................... | 705/4 |
| 5,907,828 | 5/1999 | Meyer et al. ............................... | 705/4 |

OTHER PUBLICATIONS

Gurani, Chandan; Present Worth Analysis of Deterministic Periodic Cash Flows, Engineering Economist v27 n2 Winter 1982 pp. 101–126.
Vann, John C.; A Fire Fight on Our Hands, Management Accounting–London v59 n1 PP:35 Jan. 1981.
Hess, Stephen B.; Business Interruption Insurance is Safet net, Business First of Louisville Dec. 29, 1997.
Kurtz, Stephen; A system Dymamics Approach to Business Interruption Risk, Proceedings 15th Intl System Dynamics Conference, Aug. 19–22, 1997 vol. 2 pp. 749–753.
Korman Richard; Does the Coverage Match the Calamity?, Business Week, Mar. 1995, No. 3416, p. 118.
Jacobs J. and Weiner S.; The CPA's Role in DisaterRecovery Planning, The CPA Journal, Nov. 1997 pp. 20–24, 56–58.
Papa, Ronald J.; Having and Understanding Business Income Insurance, Units Jun. 1995 p. 35.
Wetzel, et al.; Must it Always be Risky Business? (Risk Management by Insurance), The McKinsey Quarterly Dec. 1, 1997, 14 pages.

*Primary Examiner*—Eric W. Stamber
*Assistant Examiner*—Jagdish N Patel
*Attorney, Agent, or Firm*—Reed, Smith, Shaw & McClay, LLP

[57] ABSTRACT

A system for preventing cash flow losses for an insured entity including (a) a database for storing information including a base periodic cash flow amount for the insured entity; (b) a database for storing information including an actual periodic cash flow amount for the insured entity; (c) a comparator that compares the base periodic cash flow amount to the actual periodic cash flow amount and, if the actual periodic cash flow amount is less than the base periodic cash flow amount, calculates the difference between the base periodic cash flow amount and the actual periodic cash flow amount; (d) means for making a payment to the insured equal to the difference between the base periodic cash flow amount and the actual periodic cash flow amount if the base periodic cash flow amount is greater than the actual periodic cash flow amount.

14 Claims, 8 Drawing Sheets

SYSTEM FOR PREVENTING CASH FLOW LOSSES

FIELD OF THE INVENTION

The present invention relates to methods and apparatuses for monitoring and controlling cash flow and in particular to insuring a specified cash flow over a given period.

BACKGROUND OF THE INVENTION

One of the principal difficulties in operating any business is maintaining a consistent and adequate cash flow. This is a problem separate and apart from overall profitability and is a consequence of unpredictable delays by customers in paying outstanding invoices. Thus, for example, a business that is, in fact, profitable may nonetheless be forced into financial hardships, such as bankruptcy, by unanticipated delays in collection of receivables. This risk is particularly acute in, for example, the healthcare industry where large institutional and governmental payers are likely to pay outstanding invoices eventually but are frequently dilatory in making such payments.

Typically, many businesses attempt to compensate for this type of risk by opening lines of credit or otherwise borrowing money from lending institutions. However, the cost of a line of credit is usually variable and, therefore, unpredictable. Also, lending institutions are typically free to terminate lines of credit with relatively few limitations and relatively little notice.

Accordingly, there is a need for a reliable cost effective and stable mechanism to enable a business to insure a minimum cash flow.

SUMMARY OF THE INVENTION

The present invention is directed to a system for preventing cash flow losses for an insured entity comprising: (a) a database for storing information including a base periodic cash flow amount for the insured entity; (b) a database for storing information including an actual periodic cash flow amount for the insured entity; (c) a comparator that compares the base periodic cash flow amount to the actual periodic cash flow amount and, if the actual periodic cash flow amount is less than the base periodic cash flow amount, calculates the difference between the base periodic cash flow amount and the actual periodic cash flow amount; (d) means for making a payment to the insured equal to the difference between the base periodic cash flow amount and the actual periodic cash flow amount if the base periodic cash flow amount is greater than the actual periodic cash flow amount.

The present invention is also directed to a computer implemented method for preventing cash flow losses for an insured entity comprising the steps of: (a) establishing a base periodic cash flow amount for the insured entity; (b) determining an actual periodic cash flow amount for the insured entity; and (c) if the base periodic cash flow is greater than the actual periodic cash flow, making a payment to the insured entity in an amount proportional to the difference between the base periodic cash flow and the actual periodic cash flow.

BRIEF DESCRIPTION OF THE DRAWINGS

Other objects, features and advantages of the present invention will become more fully apparent from the following detailed description of the preferred embodiments, the appended claims and the accompanying drawings in which:

DETAILED DESCRIPTION OF THE PREFERRED EMBODIMENT(S)

Figure 1:
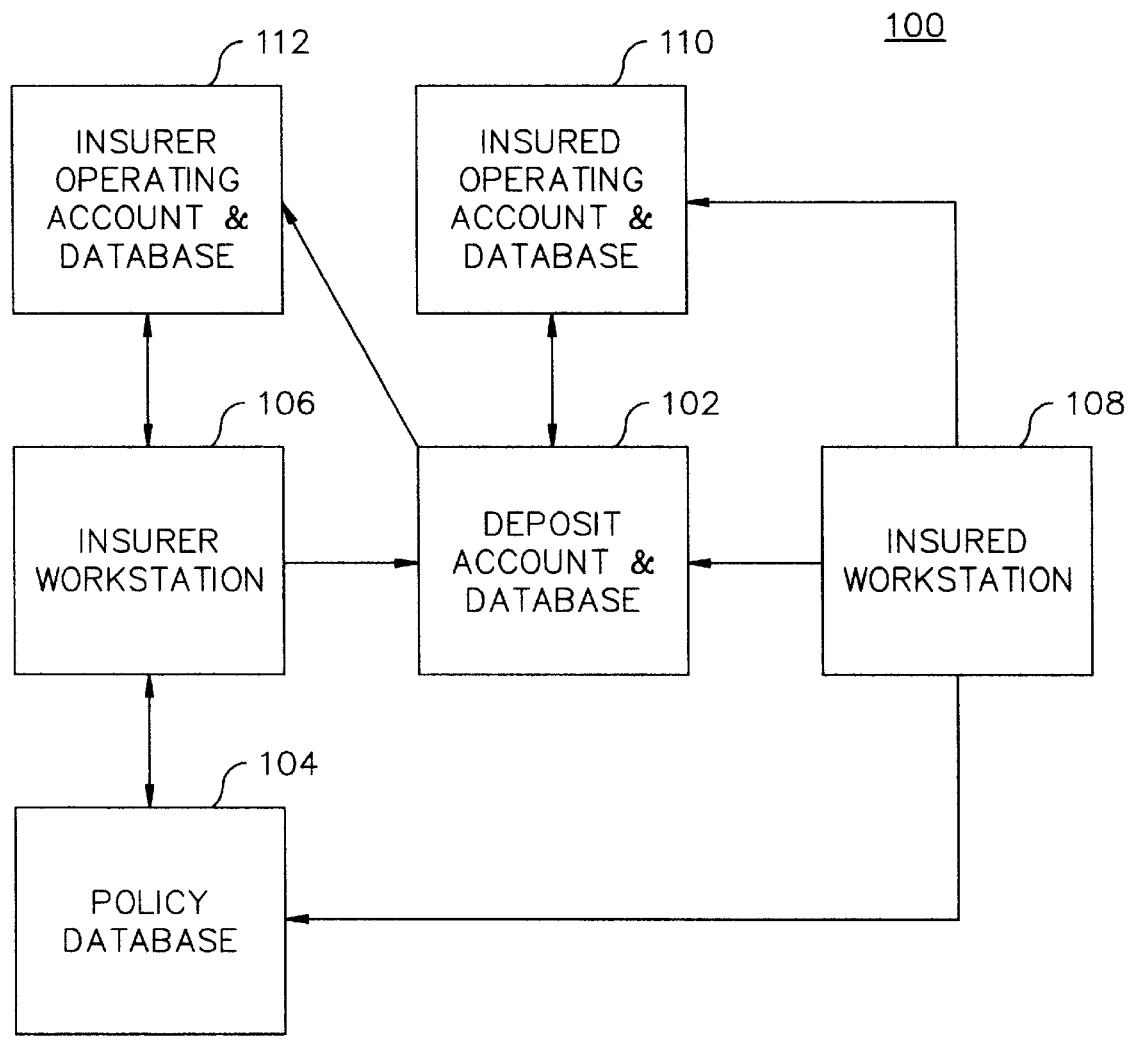
FIG. 1 is a schematic diagram of a system for preventing cash flow losses in accordance with a preferred embodiment of the present invention.

Reference will now be made to the drawings wherein like structures are provided with like reference designations. It will be understood that the drawings included herewith only provide diagrammatic representations of a preferred embodiment of the present invention and that structures falling within the scope of the present invention may include structures different than those shown in the drawings.

A system in accordance with the present invention may be operated by an insurer to guarantee the cash flow of an insured entity. Thus, as used herein, the term "insurer" refers to the entity performing the methods or operating the apparatuses of the present invention. The term "insured entity" or "insured" refers to an entity whose cash flow is managed in accordance with the present invention. The term "policy" refers to an agreement between the insurer and the insured including an agreement as to a plurality of parameters under which the methods and apparatuses of the present invention will function in a particular situation.

Referring now to FIG. 1, there is shown a schematic diagram illustrating the operation of a system 100 for preventing cash flow losses in accordance with a preferred embodiment of the present invention. The system 100 comprises a deposit account database 102, an operating account database 110, a policy database 104, an insurer work station 106 and an insured workstation 108.

The deposit account database 102 may be any database for recording and storing information concerning a deposit account, including: the identity of the insured, who is the owner of the deposit account; the monetary value of funds held in a deposit account (i.e., the deposit account balance); individual transactions in the deposit account, including deposits and withdrawals; and access codes permitting access by the insured and the insurer. The deposit account database is preferably electronically linked to the insured workstation 108 and the insurer work station 106. The deposit account and corresponding deposit account database is preferably an account maintained by a third party, such as a bank account. Alternatively, the deposit account and corresponding deposit account database could be maintained by either the insured or the insurer. The deposit account database 102 contains access codes permitting access to the deposit account and the deposit account database 102 by both the insured and the insurer. The insurer's access codes are sufficient to permit the insurer to access the balance information as well as information regarding individual transactions in the deposit account. References hereinafter to the "deposit account" are intended to refer to both the deposit account itself and the deposit account database which contains information about the account.

Figure 2:
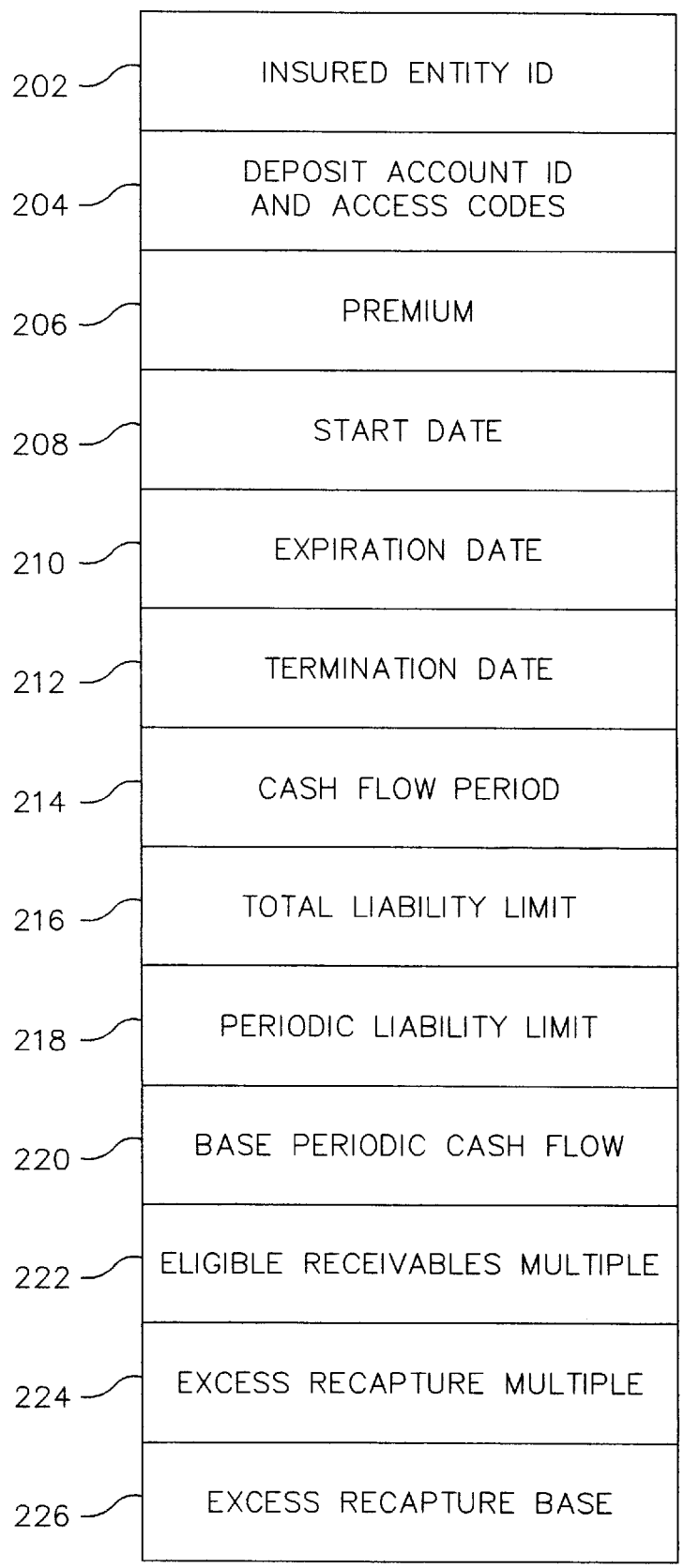
FIG. 2 shows a set of fields in a policy database in accordance with a preferred embodiment of the present invention.

The policy database 104 contains policy parameter records. As shown in FIG. 2, a policy parameter record contains the following fields: insured entity identification 202; deposit account identification and access codes 204; premium 206; start date 208, expiration date 210; termination date 212; cash flow period 214; total liability limit 216; periodic liability limit 218; base periodic cash flow ("BPCF") 220; eligible receivables multiple 222; excess recapture multiple ("ERM") 224; excess recapture base ("ERB") 226. All of the information in policy parameter record is established by agreement between the insurer and the insured prior to the policy start date and is entered by the insurer into the policy database 104. The insured entity identification 202 may include whatever identification information is necessary or desired to identify the insured entity, such as name, address, contact names, etc. The deposit account identification and access codes 204 may include whatever identification information is necessary or desired to identify the deposit account 102, such as bank name and address, account number, and whatever access codes are necessary to access the deposit account 102. The premium 206 is the fee paid by the insured to the insurer for guaranteeing a given base periodic cash flow 220. The start date is the first day of the first period for which the insurer guarantees a base periodic cash flow 220. The expiration date 210 is the last day of the last period for which the insurer guarantees a base periodic cash flow 220. The termination date 212 is the last day of the last period during which the insurer can recapture cash flow loss payments made between the start date 208 and the expiration date 210. The cash flow period 214 is the period of time over which the insurer guarantees that the insured will have a given base periodic cash flow 220. The cash flow period 214 may be any desired time period and is preferably one week or one month. The total liability limit 216 is the maximum value of cash flow losses that the insurer will pay to the insured between the start date 208 and the expiration date 210. The periodic liability limit 218 is the maximum value of cash flow losses that the insurer will pay to the insured during any single cash flow period 214. The base periodic cash flow 220 is the minimum cash flow that insurer guarantees insured will have during each cash flow period.

Figure 7:
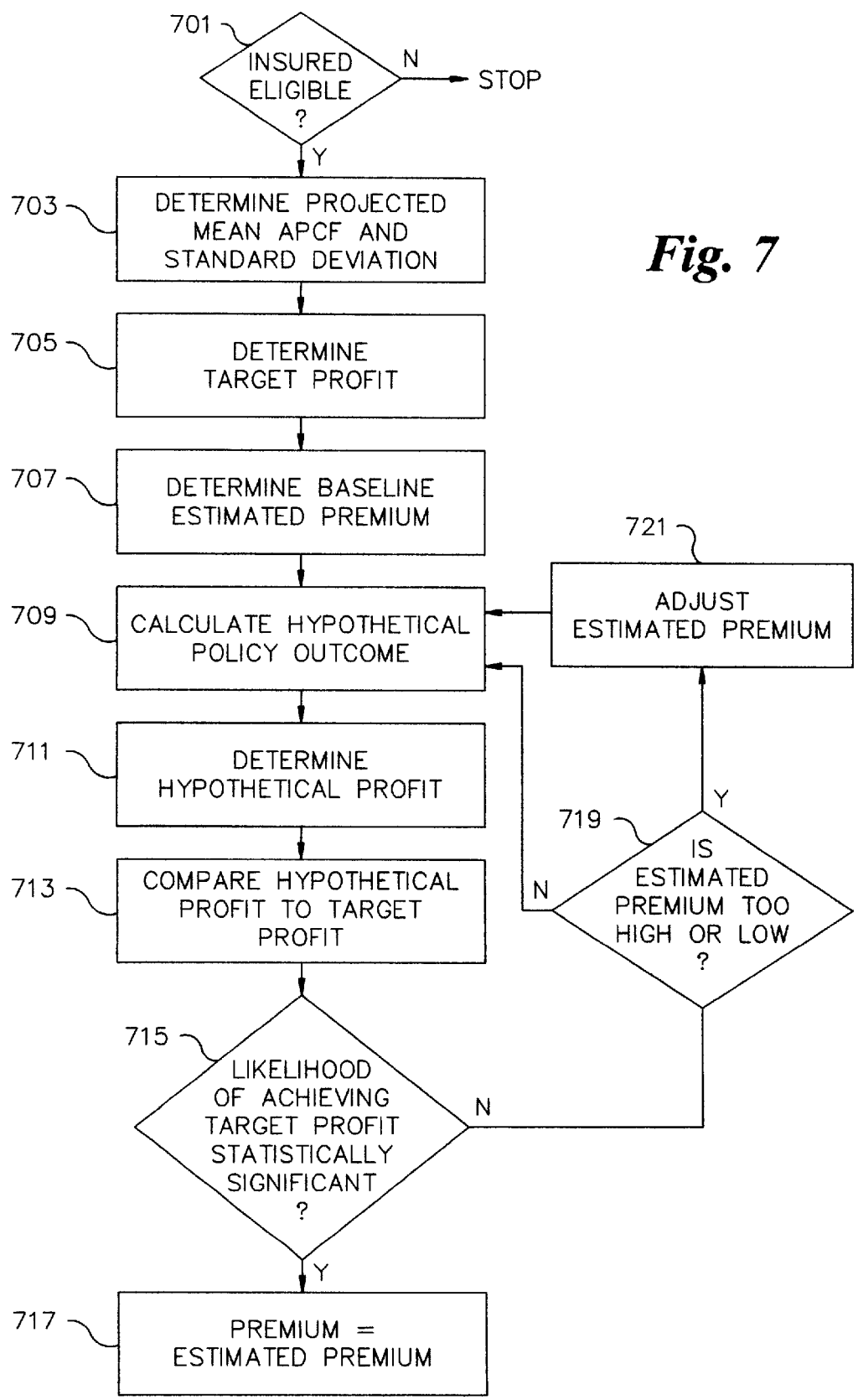
FIG. 7 is a flow diagram illustrating the steps in determining a premium in a system for preventing cash flow losses in accordance with a preferred embodiment of the present invention.

Referring now to FIG. 7, the premium 206 is determined by the insurer based on a statistical analysis of the insured's financial information, demographics and credit risk. In step 701, as a preliminary screening step, the insurer may review the insured's recent financial statements and other information to determine whether the insured has filed for bankruptcy or is otherwise severely overextended with debt. Assuming that the insurer determines that the insured is eligible for the policy, in step 703, the insurer reviews the insured's prior APCF for a period preceding the policy term—preferably for approximately the three previous years—along with the insured's own APCF forecast. The insurer reviews the past APCF averages, trends and variability to determine a projected mean APCF and standard deviation. In step 705, the insurer determines a target profit. The insurer's target profit comprises a target expense ratio (i.e., the percentage of the overall premium used to cover taxes, commissions, fixed costs, etc.) and a target interest rate which may be based on the insured's interest rate on a line of credit or other relevant market information. In step 707, the insurer determines a baseline estimated premium. In a preferred embodiment, a baseline estimated premium may be set at 0.25% of the insured's mean annual collections.

In step 709, the insurer uses the projected mean APCF and standard deviation along with the insured's desired BPCF to calculate a potential policy outcome given random APCF results generated by a random number generator using a normal statistical probability formula and based on the projected APCF standard deviation. The hypothetical policy outcome including all payments and recoveries made during the policy period is the insurer's hypothetical cost during the hypothetical policy period. In step 711, the insurer determines a hypothetical profit by subtracting the hypothetical policy outcome from the estimated premium. In step 713, the insurer compares the hypothetical profit to the target profit. In step 715, the insurer determines whether, based on the comparison in step 713, there is a statistically significant probability of achieving the target profit level. If the likelihood of achieving the target profit level is statistically significant, the insurer proceeds to step 717 in which the insurer sets the premium 206 to equal the estimated premium. If the likelihood of achieving the target profit level is not statistically significant, the insurer repeats steps 709 through 715. In step 719, the insurer determines whether the reason no statistically significant probability of achieving the target profit is because the target premium is too high or low or because an insufficient number of hypothetical policy outcome calculations have been made. In the former case, in step 721, the insurer adjusts the estimated premium and then proceeds to repeat steps 709 through 715. In the latter case, the insurer proceeds to repeat steps 709 through 715 without adjusting the estimated premium.

Typically, the insurer will repeat steps 709 through 715 at least about 300 times and preferably about 1000 times to achieve a premium that has a statistically significant probability of achieving the target profit.

The remaining parameters, including the total liability limit, the periodic liability limit, the eligible receivables multiple, the excess recapture multiple and the excess recapture base are determined on a case by case basis based upon the credit worthiness of the insured. In determining these parameters, the insurer may consider the minimum balances and maximum deficits generated in steps 709–715.

Figure 3:
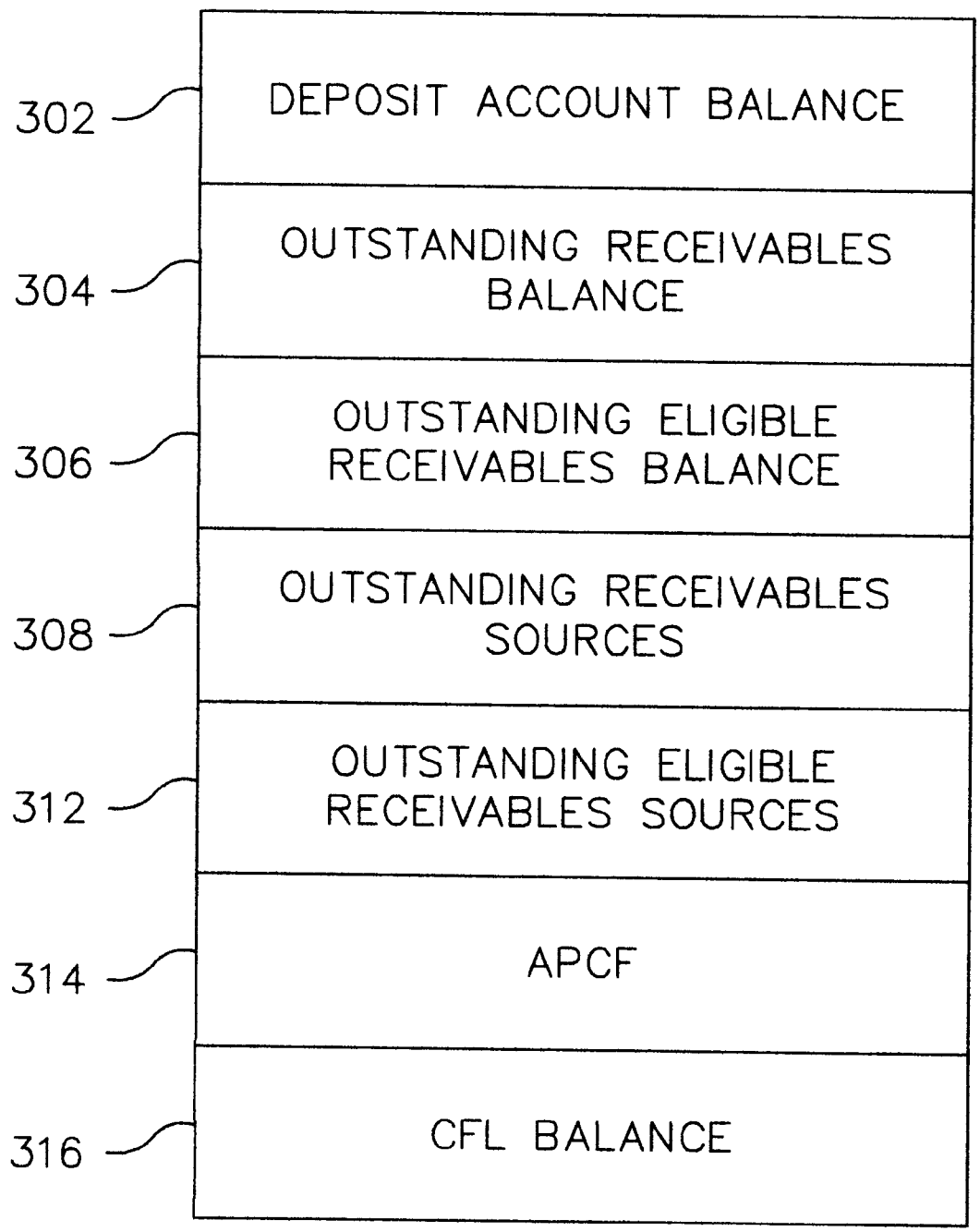
FIG. 3 shows a set of fields in a policy database in accordance with a preferred embodiment of the present invention.

The policy database 104 may also contain cash flow records. Alternatively, cash flow records may be stored in a second database. As shown in FIG. 3, a cash flow record contains the following fields: deposit account balance 302; outstanding receivables balance 304; outstanding eligible receivables balance 306; outstanding receivables sources 308; outstanding eligible receivables sources 310; actual periodic cash flow ("APCF") 312; and cash flow loss ("CFL") balance 314. The deposit account balance 302 is the current balance of funds in the deposit account. The outstanding receivables balance 304 is the current value of all amounts owed to the insured for goods and services provided by the insured in the insured's ordinary course of business. The outstanding eligible receivables balance 306 is the current value of a subset of outstanding receivables defined by agreement between the insurer and the insured. For example, in the context of an insured health care provider, the eligible receivables balance may include specified third-party payers and exclude other third-party payers. The outstanding eligible receivables balance 306 also preferably does not include receivables which the insured determines are not collectable in the ordinary course of business by the termination date 212. The APCF 312 is the value of all amounts paid to the insured during a cash flow period 214 on account of or in payment of outstanding receivables 304. The CFL balance 314 is the total amount of payments made by the insurer to the insured for cash flow losses.

The insurer workstation 106 is preferably electronically linked or linkable to the deposit account 102 and the policy database 104. The insurer workstation preferably comprises a computer with software for performing the operations and computations necessary for implementing the cash flow loss prevention policy.

Figure 4A:
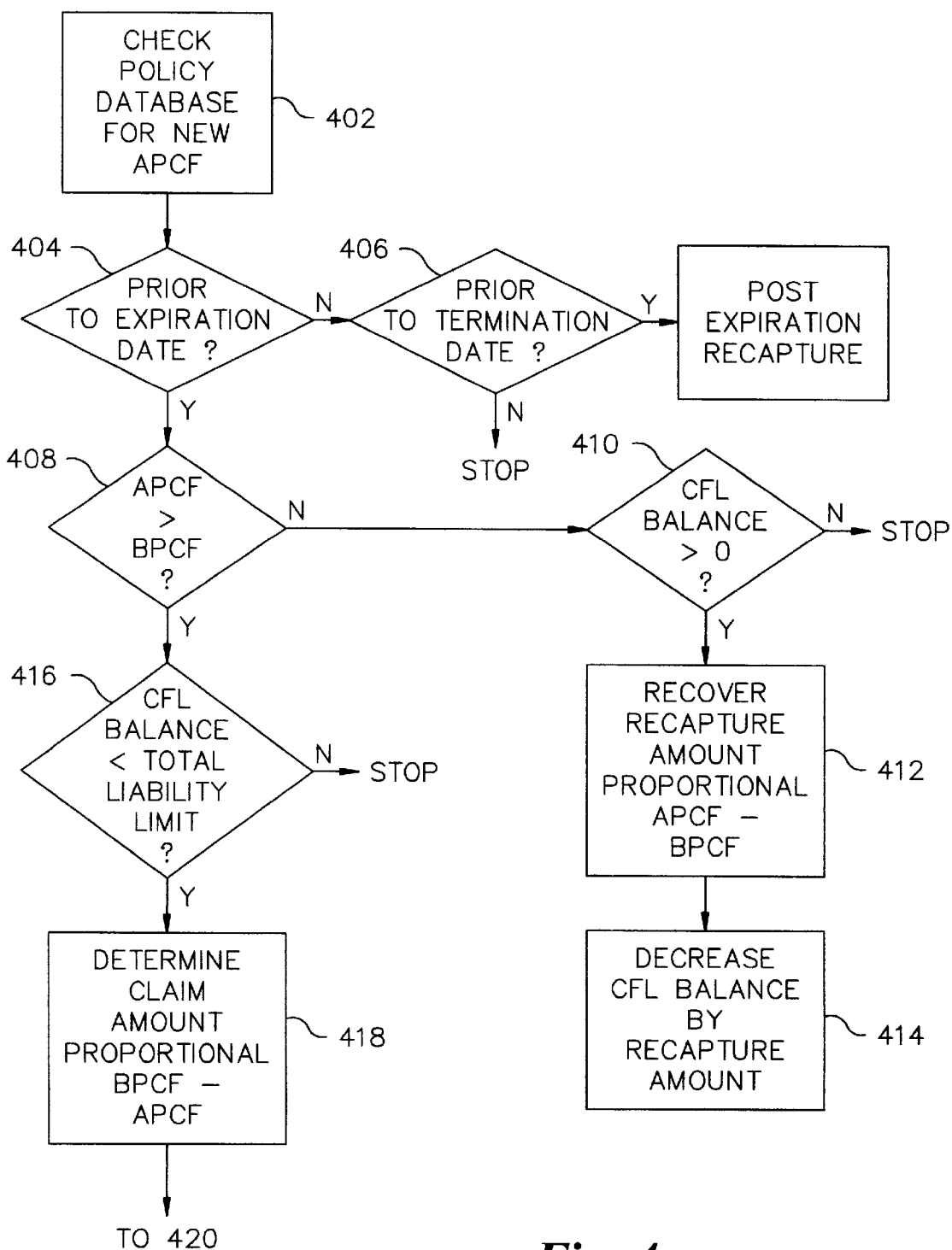
FIGS. 4–6 are flow diagrams illustrating the steps in a system for preventing cash flow losses in accordance with a preferred embodiment of the present invention.
Figure 4B:
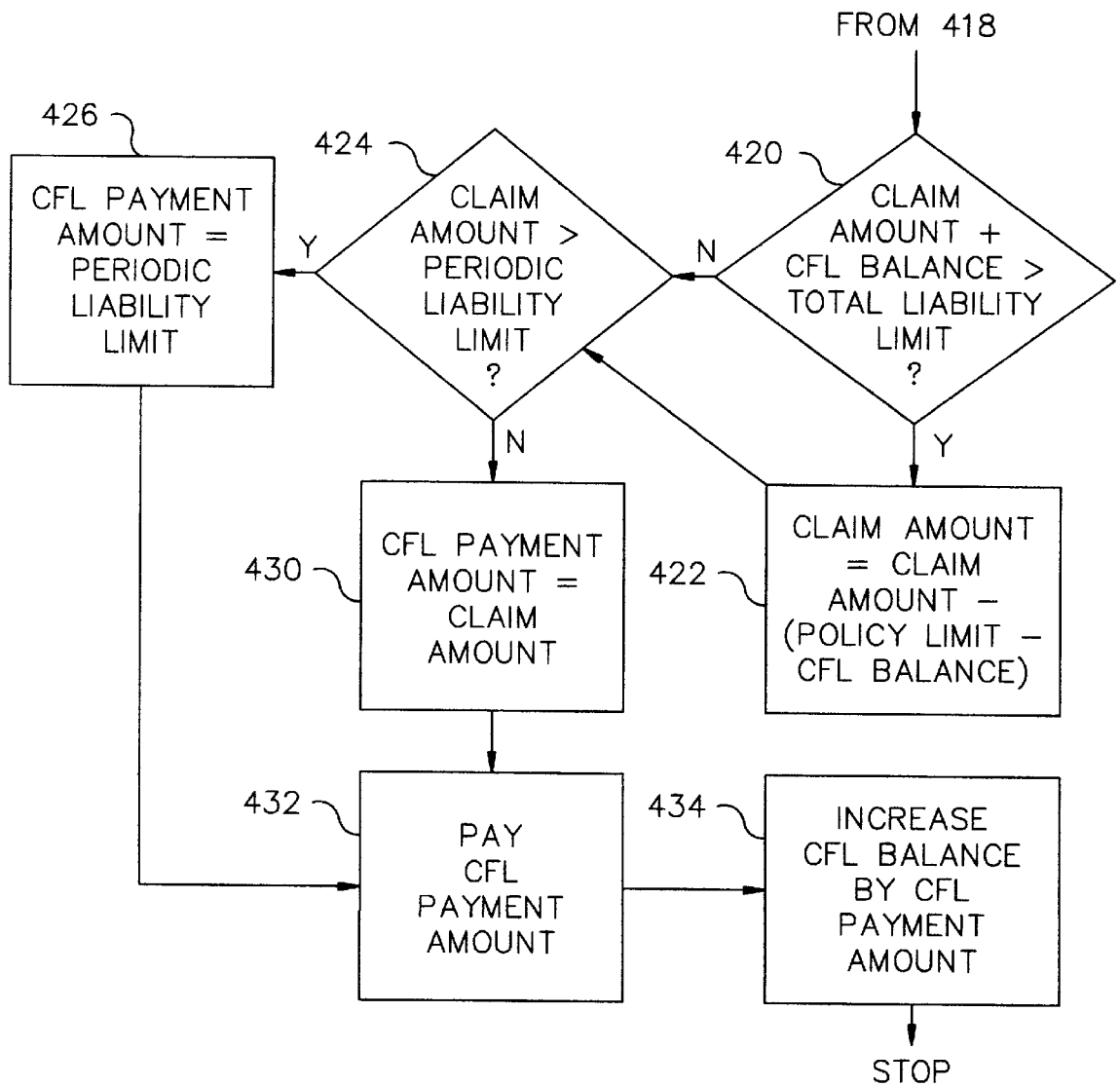

At a specified time during each cash flow period 214, the insured transmits the current APCF 312 data to the policy database 104. The insurer then uses the insurer workstation 106 to perform the operations shown in FIG. 4. In step 402 the workstation 106 checks the policy database 104 for the current APCF. In step 404, the workstation 106 compares the current date to the expiration date 210. If the current date is after the expiration date 210, the workstation 106 performs step 406 and compares the current date to the termination date 212. If the current date is after the termination date 212, the workstation may cause a notice to be issued that the policy is no longer in effect and the sub-routine ends. If the current date is after the expiration date 210 but before the termination date 212, the workstation 106 performs the operations necessary for post-expiration recapture as described below in connection with FIG. 5.

If the current date is prior to the expiration date 210, in step 408 the workstation 106 compares the APCF 312 to the BPCF 220.

If the APCF is greater than the BPCF, in step 410 the workstation 106 checks to see if the CFL balance 314 is greater than 0. If the CFL balance 314 is not greater than 0, the sub-routine ends. If the CFL balance 314 is greater than 0, in step 412 the workstation 106 calculates a recapture amount. The recapture amount is proportional to the difference between the APCF 312 and the BPCF 220. The recapture amount is also no greater than the CFL balance 314. In a preferred embodiment, the recapture amount is the lesser of the CFL balance 314 and the APCF 312 minus the BPCF 220. After calculating the recapture amount, the workstation 106 causes the recapture amount to be transferred from the deposit account 102 to the insurer operating account 112. In step 414 the workstation 106 then decreases the CFL balance 314 by the recapture amount.

If the APCF is less than the BPCF, in step 416 the workstation 106 compares the CFL balance 314 to the total liability limit 216. If the CFL balance 314 is greater than or equal to the total liability limit 216, the subroutine ends and the workstation 106 may issue a notice to the effect that the total liability limit has been reached. If the CFL balance 314 is less than the total liability limit 216, in step 418 the workstation 106 calculates a claim amount. The claim amount is proportional (preferably equal) to the difference between the BPCF 220 and the APCF 312.

In step 420 the workstation 106 compares the sum of the claim amount and the CFL balance 314 to the total liability limit 216. If the sum of the claim amount and the CFL balance 314 is greater than the total liability limit 216, in step 422 the workstation 106 adjusts the claim amount by subtracting the difference between the total liability limit 216 and the CFL balance 314 from the claim amount. If the sum of the claim amount and the CFL balance 314 is less than the total liability limit 216, the workstation 106 skips step 422. In step 424 the work station compares the claim amount to the periodic liability limit 218. If the claim amount is greater than the periodic liability limit 218, in step 426 the workstation 106 sets the CFL payment amount as equal to the periodic liability limit 218. If the claim amount or adjusted claim amount is less than the periodic liability limit 218, in step 430 the workstation 106 sets the CFL payment amount as equal to the claim amount. In step 432 the workstation 106 then causes the payment amount to be transferred from the insurer's operating account 112 to the deposit account 102. In step 434 the workstation increases the CFL balance 314 by the payment amount. After step 434, the subroutine is complete.

Figure 5:
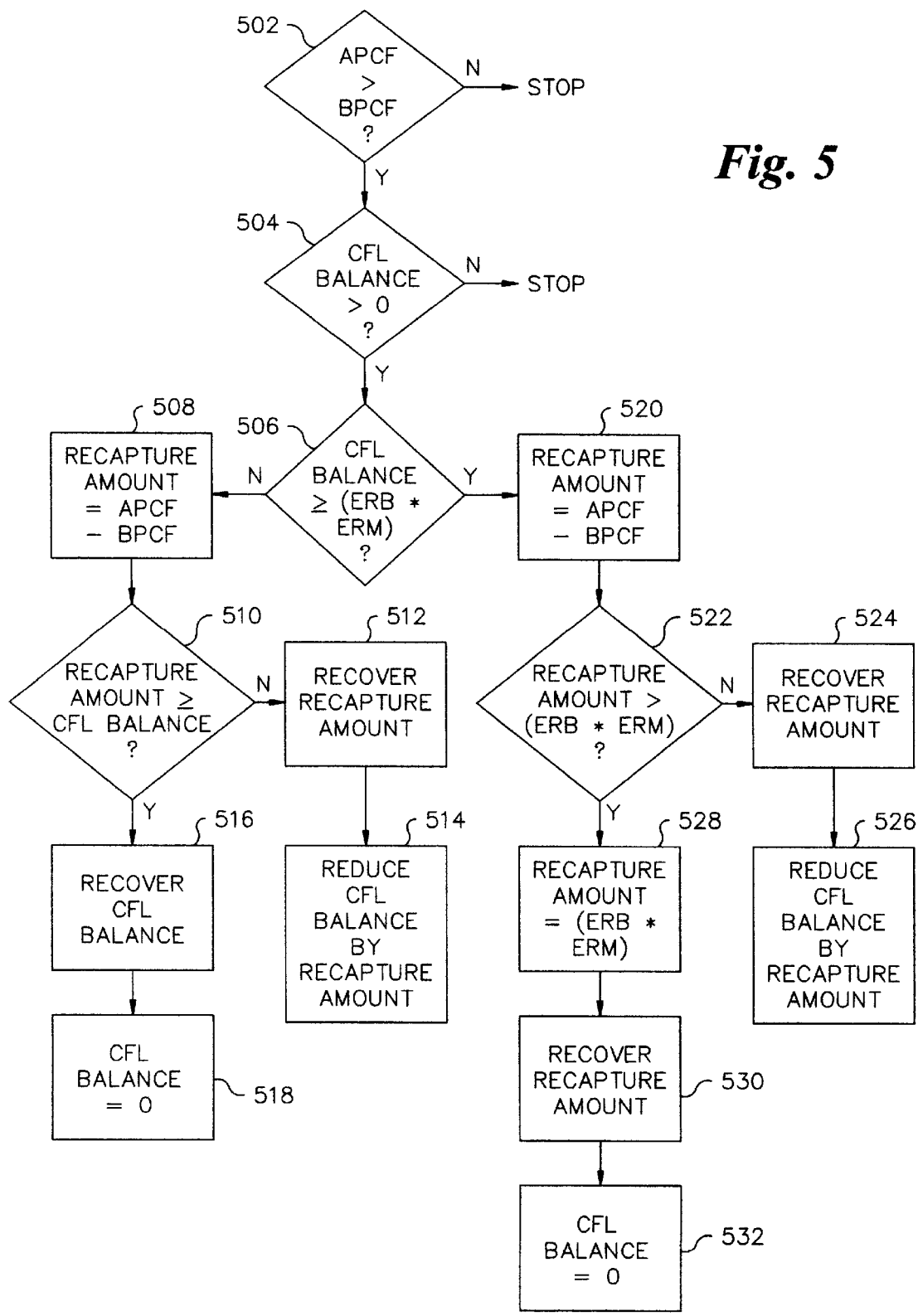

If the current date is after to the expiration date 210 and prior to the termination date 212 the workstation 106 performs the post-expiration recapture sub-routine shown in FIG. 5. In step 502 the workstation 106 compares the APCF 312 to the BPCF 220. If the APCF 312 is greater than the BPCF 220 the sub-routine ends. If the APCF 312 is greater than the BPCF 220 in step 504 the workstation 106 checks to see if the CFL balance 314 is greater than 0. If the CFL balance 314 is less than or equal to 0 the sub-routine ends. If the CFL balance 314 is greater than 0, in step 506 the workstation 106 compares the CFL balance 314 to the product of the ERB 224 and the ERM 226. If the CFL balance 314 is less than the product of the ERB 224 and ERM 226, in step 508 the workstation 106 calculates the recapture amount as the difference between the APCF 312 and the BPCF 220.

In step 510 the workstation 106 compares the recapture amount to the CFL balance 314. If the recapture amount is less than the CFL balance 314, in step 512 the workstation 106 causes the recapture amount to be transferred from the deposit account 102 to the insurer's operating account 112. In step 514 the workstation 106 then reduces the CFL balance 314 by the recapture amount.

If in step 510 the recapture amount is grater than or equal to the CFL balance 314 in step 516 the workstation 106 causes an amount to the CFL balance to be transferred from the deposit account 102 to the insurer's operating account 112.

If in step 506 the CFL balance 314 is greater than or equal to the product of the ERB 224 and ERM 226, in step 520 the workstation 106 calculates the recapture amount as the difference between the APCF 312 and the BPCF 220. In step 522 the workstation 106 compares the recapture amount to the product of the ERB 224 and the ERM 226. If the recapture amount is less than the product of the ERB 224 and the ERM 226, in step 524 the workstation 106 causes the recapture amount to be transferred from the deposit account 102 to the insurer's operating account 112. In step 526 the workstation 106 then reduces the CFL balance 314 by the recapture amount.

If in step 522 the recapture amount is grater than the product of ERB 224 and the ERM 226, in step 528 the workstation 106 recalculates the recapture amount as equal to the product of the ERB 224 and the ERM 226. Then, in step 530 the workstation 106 causes the recapture amount to be transferred from the deposit account 102 to the insurer's operating account 102. In step 532 the workstation 106 then reduces the CFL balance 314 to 0.

Figure 6:
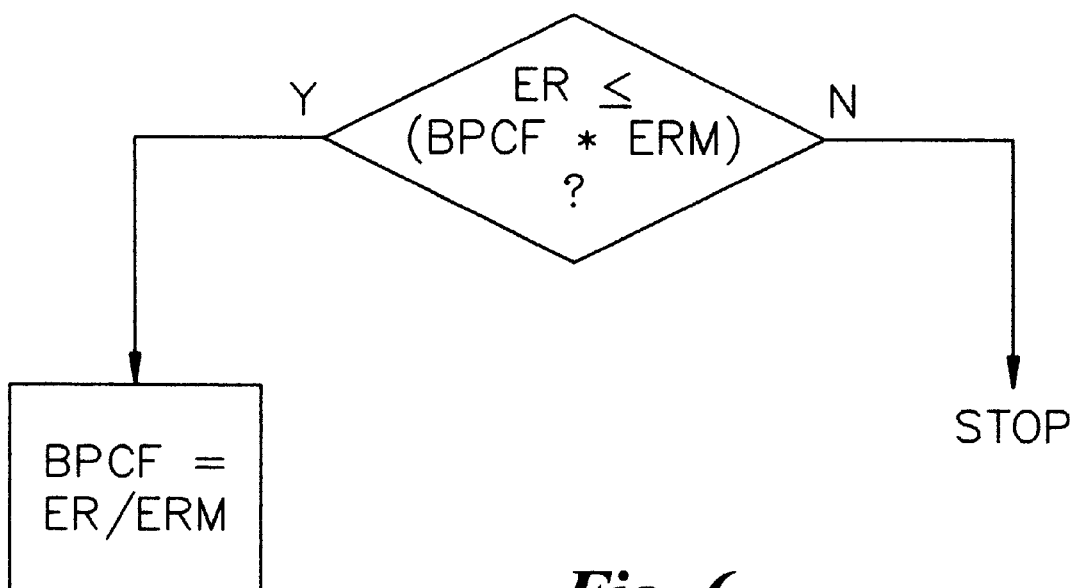

Referring now to FIG. 6 there is shown a sub-routine for reducing the BPCF 220 when the eligible receivable drop below a certain level. At step 602 the workstation 106 compares the eligible receivables 306 to the product of the BPCF 220 and the ERM 222. If the eligible receivables 306 are less than the product of the BPCF 220 and the ERM 222 the subroutine ends without changing the BPCF 220. If the eligible receivables 306 are less than or equal to the product of the BPCF 220 and the ERM 22, in step 606 the workstation resets the BPCF 220 to equal the eligible receivables 306 divided by the ERM 222. This BPCF modification sub-routine is preferably run by the workstation 106 on the same periodic schedule as the CFL sub-routine and preferably immediately prior to running the CFL sub-routine.

It will be understood by person by persons skilled in the art that various changes in the details, components, steps, and arrangements of the components and steps which have been described and illustrated in order to explain the nature of this invention may be made by those skilled in the art without departing from the principle and scope of the invention as expressed in the following claims.

What is claimed is:

1. A system for preventing cash flow losses for an insured entity comprising:

(a) a database for storing information including a base periodic cash flow amount for the insured entity;

(b) a database for storing information including an actual periodic cash flow amount for the insured entity;

(c) a comparator that compares the base periodic cash flow amount to the actual periodic cash flow amount and, if the actual periodic cash flow amount is less than the base periodic cash flow amount, calculates the difference between the base periodic cash flow amount and the actual periodic cash flow amount;

(d) means for making a payment to the insured equal to the difference between the base periodic cash flow amount and the actual periodic cash flow amount if the base periodic cash flow amount is greater than the actual periodic cash flow amount;

(e) means for recovering from the insured entity payments made by the payment means if the actual periodic cash flow amount is greater than the base periodic cash flow amount; and (f) a calculator for calculating the amount to be recovered by determining the lesser of: the difference between the actual cash flow amount and the base periodic cash flow amount; and the sum of payments made by the payment means.

2. The system of claim 1, further comprising:

a calculator that calculates a premium amount to be paid by the insured entity based on information stored in the database.

3. The system of claim 2, wherein:

the calculator comprises means for calculating a hypothetical cost of payments made by the payment means and comparing the hypothetical cost of the payments to a target profit.

4. The system of claim 3, wherein:

the calculator calculates a premium that has a statistically significant probability of yielding the target profit.

5. The system of claim 1, further comprising:

a calculator that calculates a sum of any payments made by the payment means;

a comparator that compares the sum of payments made by the payment means to a predetermined payment limit.

6. The system of claim 5, further comprising:

means for reducing the amount of any payment made by the payment means so that the payment means does not make a payment that exceeds the predetermined payment limit.

7. The system of claim 4, further comprising:

a calculator that calculates a sum of any payments made by the payment means;

a comparator that compares the sum of payments made by the payment means to a predetermined payment limit;

means for reducing the amount of any payment made by the payment means so that the payment means does not make a payment that exceeds the predetermined payment limit.

8. A computer implemented method for preventing cash flow losses for an insured entity comprising the steps of:

(a) storing information about the insured entity in a database;

(b) establishing a base periodic cash flow amount for the insured entity;

(c) determining an actual periodic cash flow amount for the insured entity; and (d) if the base periodic cash flow is greater than the actual periodic cash flow, making a payment to the insured entity in an amount proportional to the difference between the base periodic cash flow and the actual periodic cash flow;

(e) recovering from the insured entity payments made in step (d) if the actual periodic cash flow amount is greater than the base periodic cash flow amount;

(f) calculating the amount to be recovered by determining the lesser of: the difference between the actual cash flow amount and the base periodic cash flow amount; and the sum of payments made by the payment means.

9. The method of claim 8, further comprising the step of:

calculating a premium amount to be paid by the insured entity based on information stored in the database.

10. The method of claim 9, wherein the step of calculating a premium comprises the step of calculating the hypothetical cost of payments made in step (d) and comparing a hypothetical cost of the payments to a target profit.

11. The method of claim 10, wherein the step of calculating the hypothetical cost of payments made in step (d) and comparing the hypothetical cost of the payments to a target profit is repeated until the probability that the premium will yield a target profit is statistically significant.

12. The method of claim 8, further comprising the steps of:

calculating a sum of payments made in step (d);

comparing the sum of payments made in step (d) to a pre-determined payment limit.

13. The method of claim 12, further comprising the step of:

reducing the amount of a payment made in step (d) so that the payment means does not make a payment that exceeds the predetermined payment limit.

14. The method of claim 11, further comprising the steps of:

calculating the sum of payments made in step (d);

comparing the sum of payments made in step (d) to a pre-determined payment limit;

reducing the amount of a payment made in step (d) so that the payment means does not make a payment that exceeds the predetermined payment limit.

* * * * *